United States Patent
Yeri et al.

(10) Patent No.: US 12,530,510 B1
(45) Date of Patent: Jan. 20, 2026

(54) SYSTEMS AND METHODS FOR USING SILENT VARIABLES TO IMPROVE EFFICIENCY AND PERFORMANCE OF A MODELING SYSTEM

(71) Applicant: Wells Fargo Bank, N.A., San Francisco, CA (US)

(72) Inventors: Naveen Gururaja Yeri, Bangalore (IN); Tyler Case, Phoenixville, PA (US); Paul Davis, Irving, TX (US); Matt Hord, Stanley, NC (US); Ananth Kendapadi, Charlotte, NC (US); Rameshchandra Bhaskar Ketharaju, Telangana (IN); Vinothkumar Venkataraman, Bangalore (IN); Ashutosh Verma, Bangalore (IN); Yang Angelina Yang, Mountain View, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 966 days.

(21) Appl. No.: 17/645,732

(22) Filed: Dec. 22, 2021

(51) Int. Cl.
*G06F 30/20* (2020.01)
*G06F 111/02* (2020.01)

(52) U.S. Cl.
CPC .......... *G06F 30/20* (2020.01); *G06F 2111/02* (2020.01)

(58) Field of Classification Search
CPC .................................................. G06F 2111/02
USPC ............................................................ 703/6
See application file for complete search history.

(56) References Cited

U.S. PATENT DOCUMENTS

| | | |
|---|---|---|
| 8,484,145 B2 | 7/2013 | Lacaille |
| 10,904,206 B2 | 1/2021 | Rong |
| 11,301,690 B2 | 4/2022 | Latapie |
| 11,423,611 B2 | 8/2022 | Khaloo |
| 11,651,378 B2 | 5/2023 | Kubler |
| 11,797,459 B2 | 10/2023 | Perone |
| 11,860,891 B2 | 1/2024 | Nochlin |
| 2005/0222829 A1 | 10/2005 | Dumas |
| 2011/0131172 A1 | 6/2011 | Herzog et al. |
| 2015/0324686 A1 | 11/2015 | Julian et al. |
| 2016/0021503 A1 | 1/2016 | Tapia |
| 2016/0071196 A1 | 3/2016 | Joshi |
| 2016/0232455 A1 | 8/2016 | Carus |

(Continued)

FOREIGN PATENT DOCUMENTS

WO   WO-2021195689 A1 * 10/2021 ........... G06F 18/217

OTHER PUBLICATIONS

Rashpindar_2021 (Load Forecasting Under Concept Drift: Online Ensemble Learning With Recurrent Neural Network and ARIMA, IEEE Access Jul. 19, 2021) (Year: 2021).*

(Continued)

*Primary Examiner* — Brian S Cook
(74) *Attorney, Agent, or Firm* — K&L Gates LLP

(57) ABSTRACT

Systems, apparatuses, methods, and computer program products are disclosed for improving efficiency and performance of a modeling system. An example method includes receiving, by communications circuitry, a silent variable set. The example method also includes detecting, by context analysis circuitry, occurrence of a triggering condition. The example method also includes adjusting, by model adjustment circuitry, the modeling system based on the silent variable set.

20 Claims, 7 Drawing Sheets

(56) References Cited

U.S. PATENT DOCUMENTS

| | | |
|---|---|---|
| 2016/0267396 A1 | 9/2016 | Gray et al. |
| 2016/0350671 A1 | 12/2016 | Morris, II |
| 2016/0371601 A1 | 12/2016 | Grove et al. |
| 2017/0308934 A1* | 10/2017 | Liu .................. G06Q 40/06 |
| 2017/0323216 A1 | 11/2017 | Fano |
| 2019/0102700 A1 | 4/2019 | Babu et al. |
| 2019/0182545 A1 | 6/2019 | Manus et al. |
| 2019/0378044 A1 | 12/2019 | Jeffery |
| 2020/0193313 A1 | 6/2020 | Ghanta |
| 2020/0311207 A1 | 10/2020 | Kim |
| 2023/0119161 A1 | 4/2023 | Yadaw |
| 2024/0037384 A1 | 2/2024 | Lore |

OTHER PUBLICATIONS

Zhongzian_2014 (Ensemble Nonlinear Autoregressive Exogenous Artificial Neural Networks for Short-Term Wind Speed and Power Forecasting, Hindawi Publishing Corporation International Scholarly Research Notice vol. 2014) (Year: 2014).*

Morley_2018 (Measures of Model Performance Based on the Log Accuracy Ratio, AGU Publications, Jan. 23, 2018) (Year: 2018).*

Chakravorty, et al., Regime detection based risk modeling of asses classes, Qplum, Feb. 2019, 14 pages.

Sangarshanan, Two is better than one: Ensembling Models, https://towardsdatascience.com/two-is-better-than-one-ensembling-models-611ee4fa9bd8, Jun. 29, 2018, 4 pages.

Analytic Vidhya, Feature Selection Techniques in Machine Learning; https://www.analyticsvidhya.com/blog/2020/10/feature-selection-techniques-in-machine-learing/, Oct. 10, 2020, 18 pages.

Budgaga, Wal id et al.; "A framework for scalable real-time anomaly detection over voluminous, geospatial data streams"; 2017; Wiley Concurrency Computat: Pract Exper. 2017; 1-16 (Year: 2017).

Kumar, Dheeraj; "Geospatial Estimation-Based Auto Drift Correction in Wireless Sensor Networks"; Apr. 2015; ACM Transactions on Sensor Networks, vol. 11 No. 3 Article 50; 1-39 (Year: 2015).

Olivares. "Neural basis expansion analysis with exogenous variables: Forecasting electricity prices with NBEATSx" Apr. 12, 2021) ( Year: 2021).

Zhang, Jeff (Jun) et al., "Model-Switching: Dealing with Fluctuating Workloads in Machine-Learning-as-a-Service Systems", 2020; usenix association HotCloud '20; 1-8 (Year: 2020) (8 pages).

Huang, Qunying et al. "From where do tweets originate?: a GIS approach for user location inference." Workshop on Location-based Social Networks (2014) (8 pages).

Ahnn, Jong Hoon et al., "GeoServ: A Distributed Urban Sensing Platform", 2011; 2011 11th IEEE/ACM International Symposium on Cluster, Cloud and Grid Computing, 164-173 (Year: 2011) (10 pages).

Ismail, Maryam Jamela, "Adaptive Neural Network Prediction Model for Energy Consumption", 2011; IEEE; 109-113(Year 2011) (5 pages).

* cited by examiner

SYSTEMS AND METHODS FOR USING SILENT VARIABLES TO IMPROVE EFFICIENCY AND PERFORMANCE OF A MODELING SYSTEM

BACKGROUND

Sudden deviations from standard behavior can cause models to fail or otherwise output inaccurate predictions. When model prediction deviates from a ground truth significantly enough, trust in the model may be reduced.

BRIEF SUMMARY

Predictive modeling is a commonly used statistical technique to predict future behavior or outcomes. Predictive modeling typically involves analyzing historical and current data and generating and deploying a modeling system having one or more models trained on said data to help predict future outcomes. However, significant changes in normal behavior can negatively influence a deployed model of a modeling system and thereby reduce the performance of a modeling system (e.g., reduce an accuracy of predictions made by the deployed model) such that an output of the deployed model may be misleading or wrong.

For example, exogenous context (e.g., various conditions outside of a modeling system at a point in time) may induce a significant change in normal behavior, which may in turn affect performance of a model. For example, an outbreak of a highly contagious virus may significantly decrease foot traffic in a normally heavily-populated downtown district. As another example, a sudden drop in temperature may lead to a decrease in purchases of frozen food items and an increase in purchases of hot food items.

When a deployed model of a modeling system begins outputting incorrect predictions, trust in the modeling system may be diminished and future considerations of the modeling system may be negatively influenced even though the deployed model may still be suitable and only temporarily negatively affected by sudden changes in behavior (e.g., in response to a current exogenous context deviating from normal context). Therefore, a technical need exists to enable modeling systems to quickly adjust modeling solutions to mitigate deterioration of modeling system performance.

Systems, apparatuses, methods, and computer program products are disclosed herein for improving efficiency and performance of a modeling system. In this regard, a modeling solution for a modeling system may be continuously analyzed to detect occurrence of a triggering condition, and, if the triggering condition occurs, the modeling system may be adjusted by activating silent variables to improve or otherwise maintain a level of accuracy in predictions made by the modeling system. The silent variables may be dormant (e.g., not used for generating predictions) until activated in light of the triggering condition, which may, in some embodiments, include a change in exogenous context. In some embodiments, activating silent variables comprises applying weights to the variables in the modeling solution such that the variables are factored into the determination of predictions of the modeling solution.

In one example embodiment, a method is provided for improving efficiency and performance of a modeling system. The method includes receiving, by communications circuitry, a silent variable set. The method also includes detecting, by context analysis circuitry, occurrence of a triggering condition. The method also includes adjusting, by model adjustment circuitry, the modeling system based on the silent variable set.

In another example embodiment, an apparatus is provided for improving efficiency and performance of a modeling system. The apparatus includes communications circuitry configured to receive a silent variable set. The apparatus also includes context analysis circuitry configured to detect occurrence of a triggering condition. The apparatus also includes model adjustment circuitry configured to adjust the modeling system based on the silent variable set.

In another example embodiment, a computer program product is provided for improving efficiency and performance of a modeling system. The computer program product includes at least one non-transitory computer-readable storage medium storing software instructions that, when executed, cause an apparatus to receive a silent variable set. The software instructions, when executed, also cause the apparatus to detect occurrence of a triggering condition. The software instructions, when executed, also cause the apparatus to adjust the modeling system based on the silent variable set.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
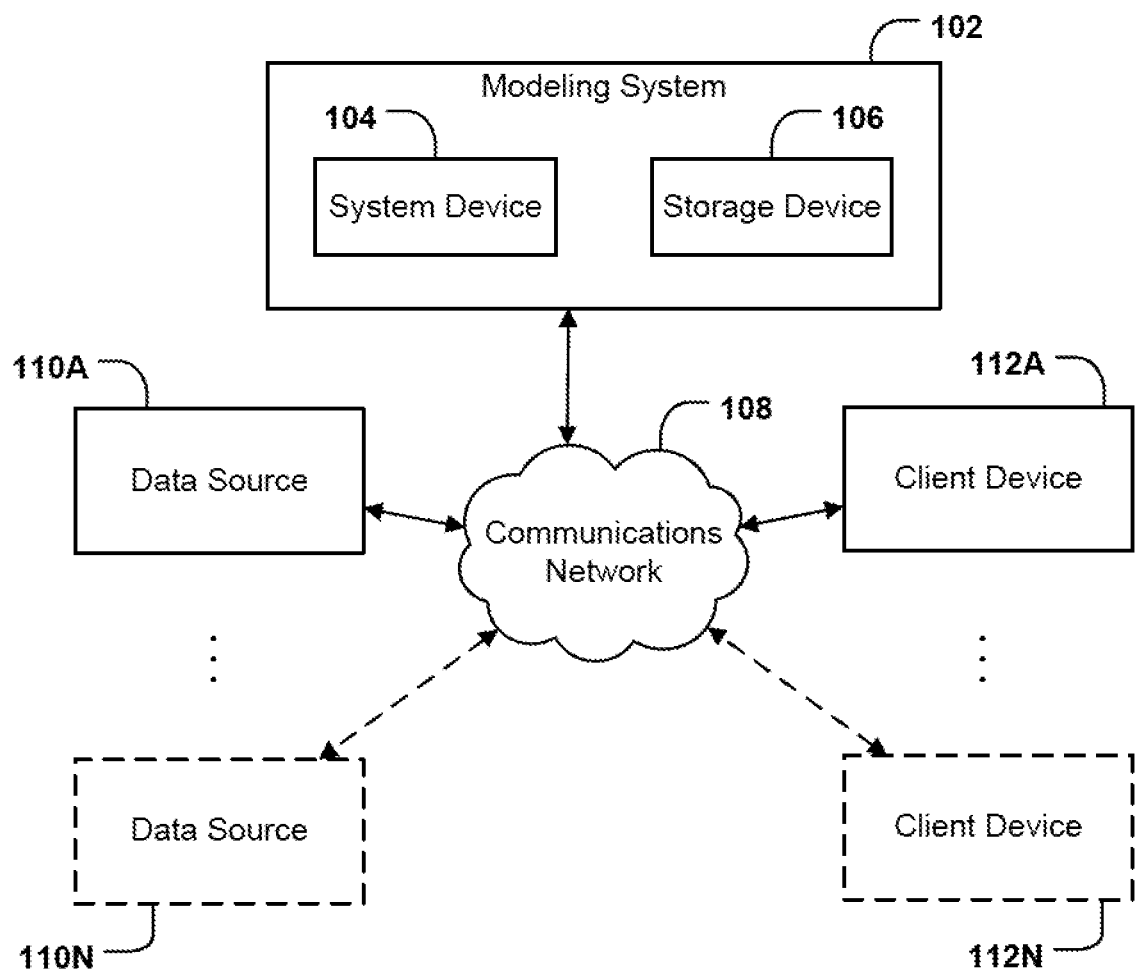
FIG. 1 illustrates a system in which some example embodiments may be used for improving efficiency and performance of a modeling system.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "exogenous context" refers to a set of information (e.g., a set of variables) that define various environmental conditions at a particular point in time and external to a modeling system. For example, an example exogenous context for a particular data point may include information associated with the data point, such as a date, time, geolocation, current temperature or other weather-related information, economic data, financial data, and/or other data which may be relevant to the particular data point. As a simple example, a data point indicating a user's mobile device being located in a shopping mall on a Thursday at 10 AM may have an exogenous context defined by a plurality of variables (e.g., in a context vector) including internal and/or external temperature, a weather forecast (e.g., raining, sunny, etc.), other devices carried by the user, other users accompanying the user, recent purchases made by the user, economic conditions at the time, etc.

The term "context vector" refers to a data structure comprising a plurality of dimensions in which each dimension indicates a corresponding piece of information (e.g., a variable having an associated value) regarding the exogenous context for a particular data point. A context vector may be generated using data queried from multiple disparate data sources using a context indicator of a data point. A context vector thus provides a lightweight and streamlined data structure for storing information relevant to an exogenous context for a data point, which, as further described below, can be used for identifying that a change in exogenous context has occurred.

The term "context indicator" refers to data included in or inferred from a data point received or otherwise obtained by a modeling system. In some embodiments, a context indicator may be temporal data indicating a particular date and/or time, such as a timestamp or the like. In some embodiments, a context indicator may be data indicating a particular location captured by the data point, such as a geographical location (e.g., location coordinates), an indication of a particular address, establishment name, and/or the like.

The term "modeling solution" refers to data and/or tools used by a modeling system to generate a prediction and/or other output. For example, a modeling solution may comprise a model (e.g., a machine learning (ML) model, artificial intelligence (AI) model, and/or other types of models) or a combination of models. A modeling solution may utilize a plurality of variables to make a prediction (e.g., predict an event, behavior, and/or the like).

The term "silent variable" refers to a variable that is not used by a modeling solution to make a prediction. A silent variable may be stored by the modeling system and activated, such that it is then used by the modeling solution to make predictions, in response to occurrence of a triggering condition, as further described herein. The term "main variable" refers to an active variable that is used by a modeling solution to make a prediction.

The term "contribution value" refers to a value assigned to a variable that represents the variable's impact on, or contribution to, a determined output (e.g., a prediction). A contribution value may be determined in a variety of ways, such as by one or more explainability algorithms known in the art. For example, a contribution value may be a Shapley Additive Explanations ("SHAP") value.

Overview

As noted above, methods, apparatuses, and computer program products are described herein that provide for improving efficiency and performance of a modeling system. Traditionally, it has been very difficult to efficiently mitigate deterioration of modeling system performance in response to changes in exogenous context before a model has been significantly impacted by the changes. In addition, there is typically no way to efficiently and effectively adjust modeling solutions in real- or near real-time such that the modeling system can continue to make accurate predictions and/or other generate appropriate outputs despite a change (whether gradual or sudden) in exogenous context.

In contrast to conventional techniques, example embodiments described herein provide an improved modeling system that efficiently recognizes triggering conditions warranting a need to adjust modeling solutions and, in response, determines and activates silent variables most correlated to a particular exogenous context. In this regard, data points continuously received by a modeling system are processed to generate and store context vectors for the data points. A context vector for a data point may include values for a plurality of variables that define an exogenous context for the data point. Data including the context vectors of the data points, as well as resulting predictive outputs over time, may be analyzed (e.g., by a data crawler) to determine correlations between variables and these variables may be linked based on their correlation (e.g., positive correlation, negative correlation, zero correlation). In some embodiments, while the modeling system is active, a modeling solution may be continuously analyzed to detect occurrence of a triggering condition, and, if the triggering condition occurs, a silent variable set may be determined based on a change in exogenous context.

In this manner, modeling solutions may be quickly adjusted by activating silent variables (and in some embodiments, deactivating main variables) in order to maintain accuracy of predictions output by the modeling system. By switching to a different modeling solution more relevant to a new exogenous context, the present disclosure sets forth systems, methods, and apparatuses that improve efficiency and performance of modeling systems and effectively mitigate deterioration of model performance due to changes in exogenous context. Accordingly, example embodiments enable modeling systems to continue to output accurate and relevant predictions even when faced with sudden and/or significant changes in exogenous context (e.g., spurred on, in some examples, by major events such as natural disasters, virus outbreaks, or the like). Embodiments herein thus provide an automated solution that can operate in real-time or near real-time to improve modeling system efficiency and performance while effectively mitigating deterioration in modeling system performance. Further, embodiments herein avoid any need for manual human intervention for model adjustment, variable activation or deactivation and associated analysis, and/or other correction of the modeling system. Moreover, example embodiments can not only enhance modeling system performance, but also improve an underlying computer by deactivating variables that are unrelated to a relevant exogenous context, allowing for higher computational efficiency to be achieved while reducing network bandwidth and/or storage requirements.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, a modeling system 102 may include a system device 104 in communication with a storage device 106. Although system device 104 and storage device 106 are described in singular form, some embodiments may utilize more than one system device 104 and/or more than one storage device 106. Additionally, some embodiments of the modeling system 102 may not require a storage device 106 at all. Whatever the implementation, the modeling system 102, and its constituent system device(s) 104 and/or storage device (s) 106 may receive and/or transmit information via communications network 108 (e.g., the Internet) with any number of other devices, such as one or more of data sources 110A-110N, and/or client devices 112A-112N.

System device 104 may be implemented as one or more servers, which may or may not be physically proximate to other components of modeling system 102. Furthermore, some components of system device 104 may be physically proximate to the other components of modeling system 102 while other components are not. System device 104 may receive, process, generate, and transmit data, signals, and electronic information to facilitate the operations of the modeling system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the modeling system 102. Storage device 106 may store information relied upon during operation of the modeling system 102, such as various data that may be used by the modeling system 102 and/or the like. In addition, storage device 106 may store control signals, device characteristics, and access credentials enabling interaction between the modeling system 102 and one or more of the data sources 110A-110N or client devices 112A-112N.

The one or more data sources 110A-110N may be embodied by any computing devices known in the art, such as servers, desktop or laptop computers, tablet devices, smartphones, or the like or may be embodied by any storage devices known in the art. Similarly, the one or more client devices 112A-112N may be embodied by any computing devices known in the art, such as desktop or laptop computers, tablet devices, smartphones, or the like. The one or more data sources 110A-110N and the one or more client devices 112A-112N need not themselves be independent devices, but may be peripheral devices communicatively coupled to other computing devices.

Although FIG. 1 illustrates an environment and implementation in which the modeling system 102 interacts with one or more of data sources 110A-110N and/or client devices 112A-112N, in some embodiments users may directly interact with the modeling system 102 (e.g., via input/output circuitry of system device 104). Whether by way of direct interaction or via a separate client device 112A-112N, a user may communicate with, operate, control, modify, or otherwise interact with the modeling system 102 to perform the various functions and achieve the various benefits described herein.

Example Implementing Apparatuses

Figure 2:
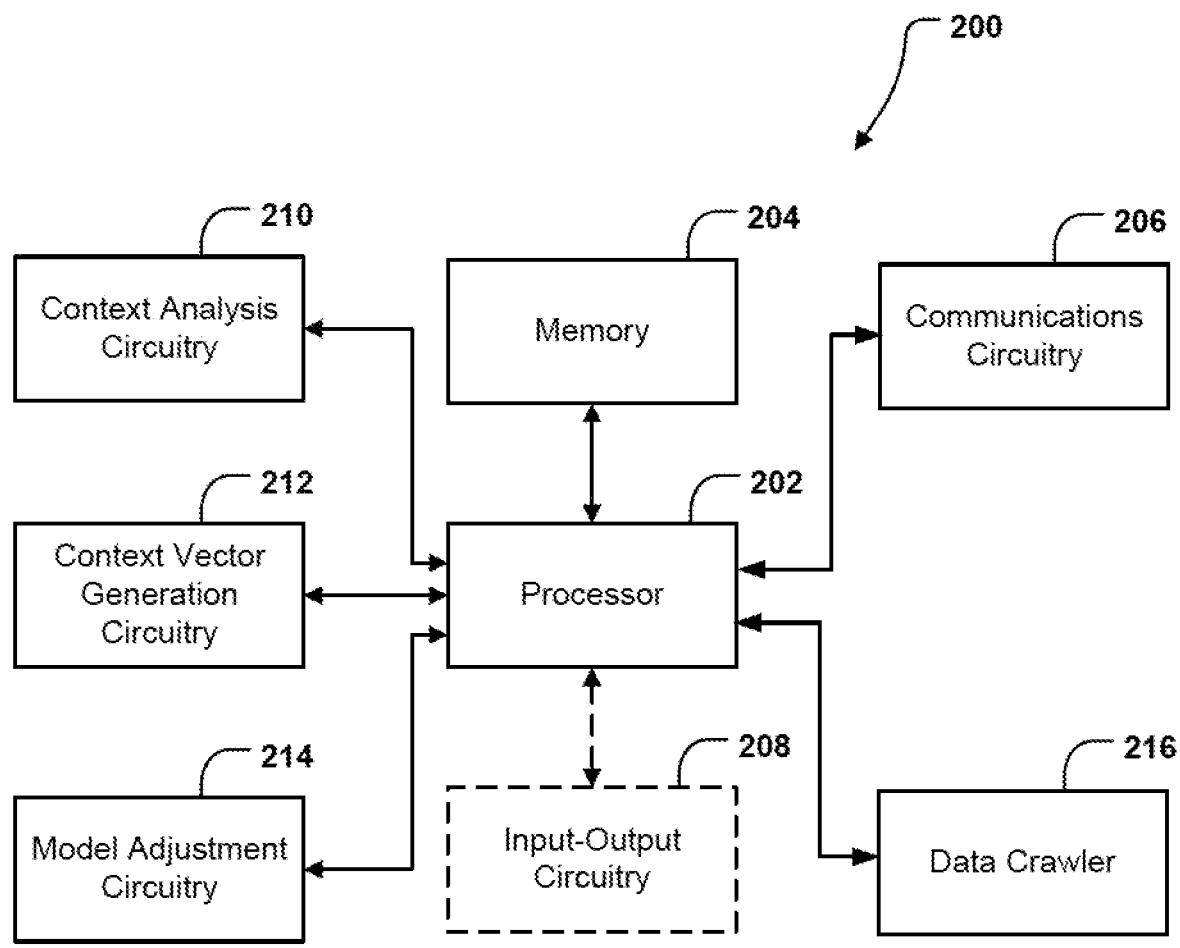
FIG. 2 illustrates a schematic block diagram of example circuitry embodying a device that may perform various operations in accordance with some example embodiments described herein.

System device 104 of the modeling system 102 (described previously with reference to FIG. 1) may be embodied by one or more computing devices or servers, shown as apparatus 200 in FIG. 2. As illustrated in FIG. 2, the apparatus 200 may include processor 202, memory 204, communications circuitry 206, input-output circuitry 208, context analysis circuitry 210, context vector generation circuitry 212, model adjustment circuitry 214, and a data crawler 216, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 3-7.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processor for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as one of client devices 112A-112N (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises context analysis circuitry 210 that detects occurrence of triggering conditions and identifies occurrence of changes in exogenous context. The context analysis circuitry 210 may utilize processor 202, memory 204, or any other hardware component included in the apparatus 200 to perform these operations, as described in connection with FIGS. 3-7 below. The context analysis circuitry 210 may further utilize communications circuitry 206 to gather data from a variety of sources (e.g., data sources 110A-110N, storage device 106, as shown in FIG. 1, and/or the like), and in some embodiments may utilize processor 202 and/or memory 204 to detect occurrence of triggering conditions.

In addition, the apparatus 200 further comprises context vector generation circuitry 212 that selects a plurality of variables defining an exogenous context for a target data point and generates a context vector based on the identified values for the plurality of variables. The context vector generation circuitry 212 may utilize processor 202, memory 204, or any other hardware component included in the apparatus 200 to perform these operations, as described in connection with FIGS. 3-7 below. The context vector generation circuitry 212 may further utilize communications circuitry 206 to gather data from a variety of sources (e.g., data sources 110A-110N, client devices 112A-112N, or storage device 106, as shown in FIG. 1), may utilize input-output circuitry 208 to receive data from a user, and in some embodiments may utilize processor 202 and/or memory 204 to generate a context vector.

In addition, the apparatus 200 further comprises model adjustment circuitry 214 that adjusts a modeling system based on a silent variable set. The model adjustment circuitry 214 may utilize processor 202, memory 204, or any other hardware component included in the apparatus 200 to perform these operations, as described in connection with FIGS. 3-7 below. The model adjustment circuitry 214 may further utilize communications circuitry 206 to gather data from a variety of sources (e.g., data sources 110A-110N, storage device 106, as shown in FIG. 1, and/or the like), and in some embodiments may utilize processor 202 and/or memory 204 to adjust a modeling solution.

In addition, the apparatus 200 further comprises a data crawler 216 that analyzes stored data (e.g., context vectors, generated predictions and/or other output of one or more modeling solutions of the modeling system, time-series data, and/or the like) to identify correlations between variables and link variables based on the identified correlations. The data crawler 216 may utilize processor 202, memory 204, or any other hardware component included in the apparatus 200 to perform these operations, as described in connection with FIGS. 3-7 below. The data crawler 216, in some embodiments may utilize processor 202 and/or memory 204 to perform analysis and correlation identification operations on data obtained and generated by the modeling system 102.

Although components 202-216 are described in part using functional language, it will be understood that the particular implementations necessarily include the use of particular hardware. It should also be understood that certain of these components 202-216 may include similar or common hardware. For example, context analysis circuitry 210, context vector generation circuitry 212, model adjustment circuitry 214, and the data crawler 216 may each, at times, leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the context analysis circuitry 210, context vector generation circuitry 212, model adjustment circuitry 214, and the data crawler 216 may leverage processor 202, memory 204, communications circuitry 206, or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the context analysis circuitry 210, context vector generation circuitry 212, model adjustment circuitry 214, and the data crawler 216 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Turning to FIGS. 3-7, example flowcharts are illustrated that contain example operations implemented by example embodiments described herein. The operations illustrated in FIGS. 3-7 may, for example, be performed by system device 104 of the modeling system 102 shown in FIG. 1, which may in turn be embodied by an apparatus 200, which is shown and described in connection with FIG. 2. To perform the operations described below, the apparatus 200 may utilize one or more of processor 202, memory 204, communications circuitry 206, input-output circuitry 208, context analysis circuitry 210, context vector generation circuitry 212, model adjustment circuitry 214, data crawler 216, and/or any combination thereof. It will be understood that user interaction with the modeling system 102 may occur directly via input-output circuitry 208, or may instead be facilitated by a separate client device 112A-112N, as shown in FIG. 1, and which may have similar or equivalent physical componentry facilitating such user interaction.

In some embodiments, a modeling system (e.g., modeling system 102) may comprise a plurality of modeling solutions (e.g., trained models) to generate various predictions, for example, outcomes such as predicted events, behaviors, and/or the like. An example modeling solution of the modeling system 102 may predict outcomes by performing one or more calculations using variables. While the modeling system may recognize a large quantity of different variables, for a particular modeling solution, the modeling solution may utilize only a portion of these variables to make predictions. The modeling solution may utilize only a portion of a larger set variables for a number of reasons. For instance, the ability to make accurate predictions using a minimal number of variables may be desired due to increased speed of prediction, less computational resource overhead, and/or similar reasons. Utilizing a minimum number of variables in a modeling solution may also be desired for model explainability and interpretability purposes. In this regard, while a number of variables may be used by a modeling solution to generate a predictive output (e.g., main variables), a number of variables may not be used (e.g., silent variables). These silent variables may lie dormant and not factor into calculations in generating a predicted output of a modeling solution. In this regard, the silent variables may have a weight of zero when calculating a predictive output.

As described above, changes in exogenous context may influence variables significantly such that a modeling solution may no longer be able to make accurate predictions. In order to detect changes in exogenous context, as well as to determine correlations between variables, the modeling system 102 may generate context vectors for received data points. In this regard, the apparatus 200 includes means, such as processor 202, memory 204, context vector generation circuitry 212, and/or the like, for generating a plurality of context vectors for a plurality of data points obtained by the modeling system.

Figure 3:
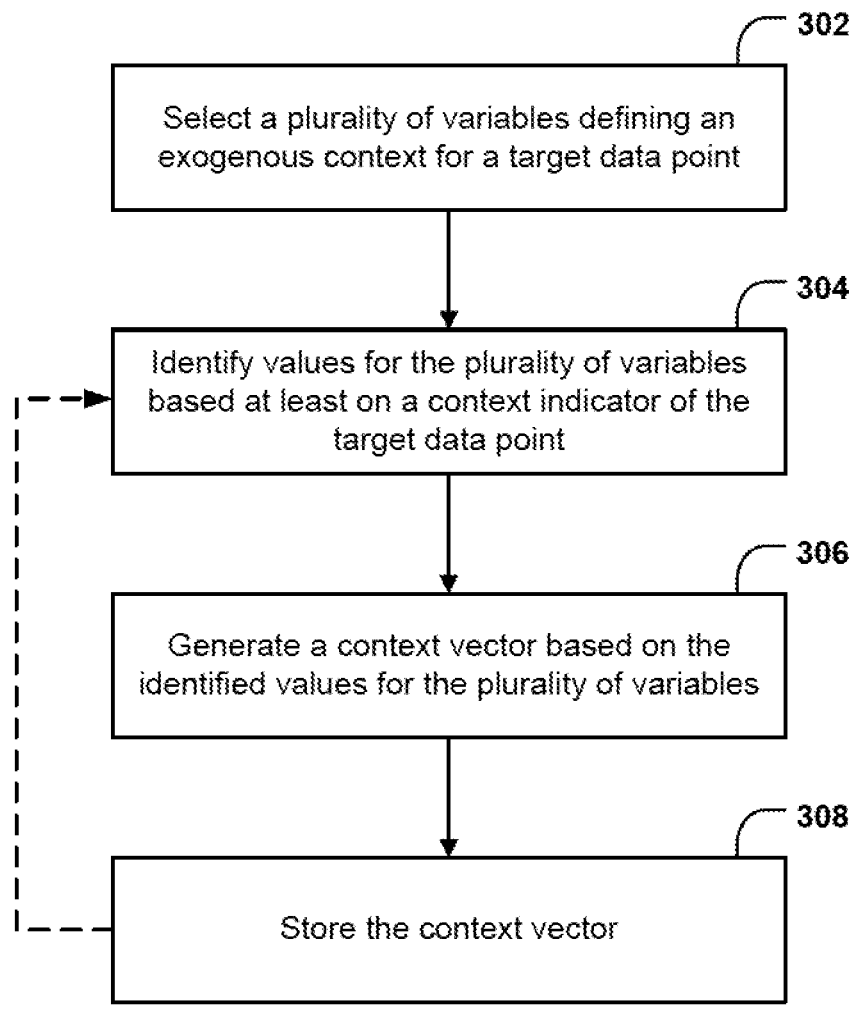
FIG. 3 illustrates an example flowchart for generating a context vector, in accordance with some example embodiments described herein.

Turning first to FIG. 3, example operations are shown for generating a context vector. The operations set forth in connection with FIG. 3 may be performed using data points received by a modeling system in real- or near-real-time (e.g., a context vector may be generated for each new data point, and then as the data point is stored, the context vector is included with the data point). It will be understood, however, that in some embodiments the operations set forth in FIG. 3 may be performed on a historical data set (e.g., on previously stored data that does not yet have context vectors that have been generated for its various data points), in which case the operations set forth in FIG. 3 may be iteratively performed for each data point in the historical data set. In some embodiments, these operations may be performed on an ad hoc basis (e.g., where a data set has some data points with context vectors and some without, or where a user proactively directs the generation of a context vector for a data point).

As shown by operation 302, the apparatus 200 includes means, such as processor 202, memory 204, context vector generation circuitry 212, and/or the like, for selecting a plurality of variables defining an exogenous context for a target data point. In some embodiments, the modeling system 102 may receive (e.g., via communications circuitry 206) or otherwise obtain over time various data points in real-time or in near real-time from various sources (e.g., data sources 110A-110N, client devices 112A-112N, and/or other sources). These various data points may be used by the modeling system 102, e.g., to make predictions using one or more modeling solutions, to build out training data, and/or other purposes. In some embodiments, the modeling system 102 may process a target data point (e.g., a data point for which a context vector is to be generated) in order to determine an exogenous context for the target data point and create a context vector which describes the target data point and its exogenous context. In this regard, a plurality of variables may be selected to define the exogenous context of the target data point. In some embodiments, the target data point may reflect current information collected in near real-time. In some embodiments, the target data point may reflect historical information (e.g., the target data point was previously collected at an earlier point in time). In this regard, the target data point may have been retrieved by the modeling system 102 from a pre-existing data set or other previously stored data.

Selection of the plurality of variables defining the exogenous context for the target data point may occur in a number of ways. In some embodiments, a predefined set of variables may apply to define an exogenous context for all data points obtained by the modeling system 102. For instance, the predefined set of variables may be received from a user (in which case the context vector generation circuitry 212 may leverage the input-output circuitry 208 to retrieve that user input, or may leverage the communications circuitry 206 to gather that user input from a separate device), or the predefined set of variables may be retrieved from storage (in which case the context vector generation circuitry 212 may retrieve the plurality of variables from memory 204 or from a storage device hosted by a separate device). However, in some embodiments, the plurality of variables may be identified directly by the context vector generation circuitry 212. To this end, the context vector generation circuitry 212 may determine the set of variables available about the time, date, or location of the target data point, and may automatically determine a subset of the available variables that are relevant to exogenous context. Many variables about a target data point may not relate to context, and thus may be discarded by the context vector generation circuitry 212. Any remaining variables may be selected as the plurality of variables defining the exogenous context for the target data point.

In some embodiments, the plurality of variables used to define an exogenous context may be predefined based on a type of data point. For example, certain variables may apply to all data points obtained by the modeling system 102, such as, for example, a location and a time for the data point, whereas other variables may only apply in certain circumstances, such as for certain types of data points (economic information may automatically be deemed relevant for data points relating to purchases or other financial transactions, while it may automatically be deemed irrelevant for data points that do not relate to purchases or financial transactions).

As shown by operation 304, the apparatus 200 includes means, such as processor 202, memory 204, communications circuitry 206, context vector generation circuitry 212, and/or the like, for identifying values for the plurality of variables based at least on a context indicator of the target data point. An example context indicator may be a timestamp of the data point. In some embodiments, the timestamp may comprise a date and/or time for the data point. Another example context indicator may be a geolocation associated with the data point (e.g., a location from which the data point originated).

In this regard, the modeling system 102 may utilize additional, external systems to retrieve information pertinent to determining an exogenous context for the target data point. The modeling system 102 may leverage a context indicator of the data point rather than all information regarding the data point in order to utilize the smallest required amount of relevant information needed for populating the context vector for the target data point while avoiding unnecessary data transmission and/or burdening of a network (e.g., communications network 108) with unnecessary data load transfer. In some embodiments, multiple context indicators may be used to obtain value(s) for one or more variables. For example, a value for a temperature variable indicating the temperature at the particular location and particular time of the data point may be retrieved from a data source 110A-110N (e.g., the National Weather Service or other organization providing weather data) by querying the data source for data based on context indicators for a geolocation and a date/time (e.g., a query for the temperature at 3 PM on August 10 in Austin, Texas).

In this regard, the apparatus 200 includes means, such as processor 202, memory 204, communications circuitry 206, and/or the like, for querying one or more data sources using at least the context indicator for the target data point. The apparatus 200 also includes means, such as processor 202, memory 204, communications circuitry 206, and/or the like, for retrieving at least a portion of the values for the plurality of variables from the one or more data sources. In some embodiments, querying and retrieval of the values may be performed for each variable defining the exogenous context of a target data point. In some cases, the values for the plurality of variables may already been available locally to the apparatus 200, in which case an external query may not be needed or performed.

As shown by operation 306, the apparatus 200 includes means, such as processor 202, memory 204, context vector generation circuitry 212, and/or the like, for generating a context vector based on the identified values for the plurality of variables. In this regard, each variable and its corresponding identified value may be stored as respective dimensions of a context vector. The context vector provides a streamlined definition of an exogenous context for a particular data point.

The context vector may then be stored (e.g., in storage device 106 or the like). In some embodiments, the context vector may be stored together with a plurality of other context vectors having been generated for other data points. For example, context vectors may be stored by the modeling system 102 in memory 204, storage device 106, in cloud-based storage (e.g., via communications network 108), or the like. In this regard, as shown by operation 308, the apparatus 200 includes means, such as processor 202, memory 204, communications circuitry 206, context vector generation circuitry 212, and/or the like, for storing the context vector. In some embodiments, the method may iteratively return to operation 304 in which additional context vectors for additional data points (e.g., newly received data points and/or data points in a preexisting data set) may be generated.

In some embodiments, the modeling system 102 may analyze stored data, e.g., context vectors and time-series data comprising predictive outputs made by modeling solutions using data points received by the modeling system to determine correlations between variables and develop links between variables based on their correlation. For example, in some embodiments, a data crawler 216 may be used to analyze the stored data and output correlations between variables and link the variables based on their correlations. For example, two variables may be positively correlated, such that when one variable increases, so does the other. In some cases, variables may be negatively correlated, such that when the value of a variable decreases, another variable's value increases. Further, some variables may be determined to not show any correlation (e.g., zero correlation). The data crawler 216 may establish links between correlated variables and store these links (e.g., in a table or other data structure) in storage device 106. In this manner, when a particular variable changes significantly to influence a change in exogenous context (as further described below), variables that have some relationship (e.g., through a correlation) to that particular variable may easily be identified and retrieved.

Figure 4:
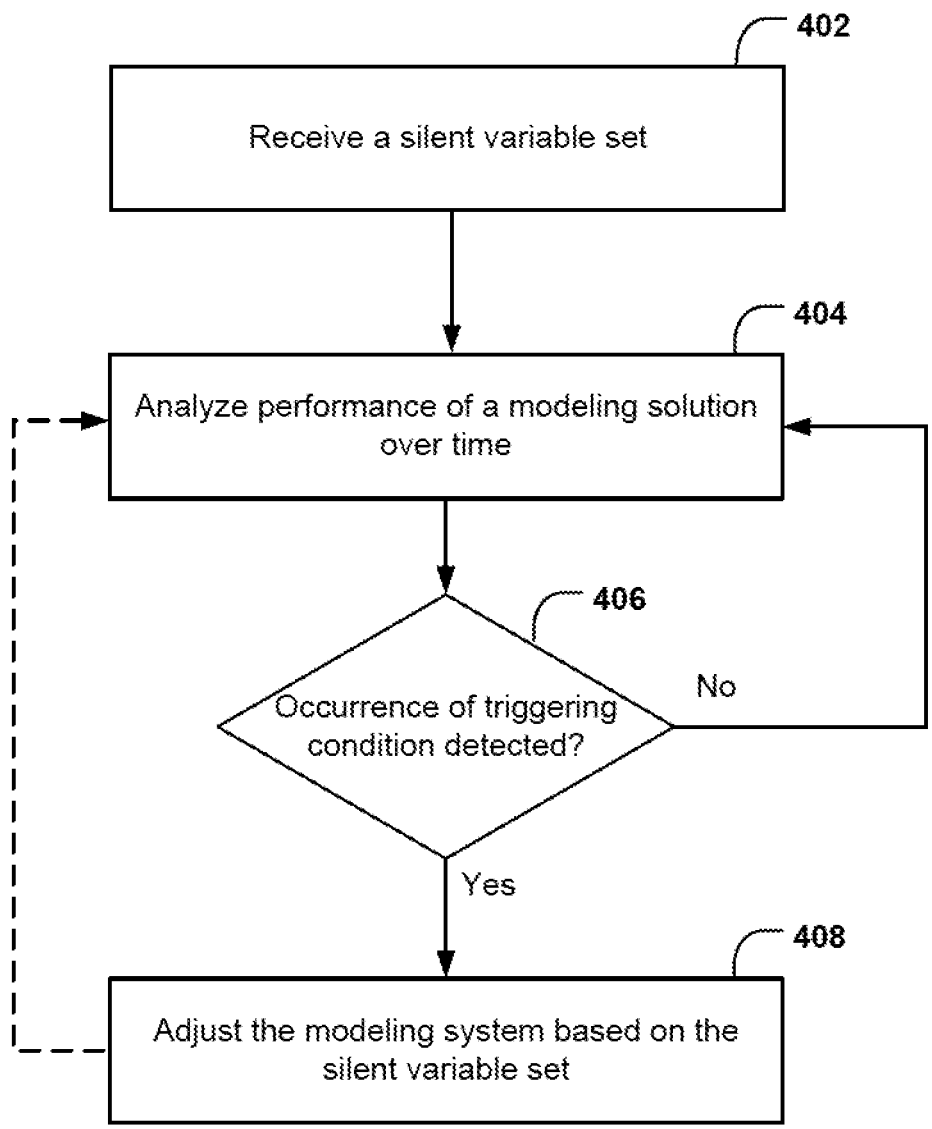
FIG. 4 illustrates an example flowchart for improving efficiency and performance of a modeling system, in accordance with some example embodiments described herein.

Turning next to FIG. 4, example operations are shown for improving efficiency and performance of a modeling system by activating silent variables in response to an occurrence of a triggering condition.

In some embodiments, the apparatus 200 includes means, such as processor 202, memory 204, communications circuitry 206, input-output circuitry 208, model adjustment circuitry 214, or the like, for initializing a modeling system using a first modeling solution. In this regard, a modeling system (e.g., modeling system 102) may be initialized such that the modeling system continuously receives or otherwise obtains data points and processes the data points via the source modeling solution to generate an output of the modeling system (e.g., predictions, such predicted events, behaviors, values, and/or other data), while also generating context vectors for those data points as described above. The first modeling solution may utilize a plurality of main variables to make predictions for the data points. In this regard, the first modeling solution may consider certain values of variables of the data points in calculations to determine a prediction. In some embodiments, these main variables may be pre-selected for use based on a variety of factors, such as predictive power, current exogenous context, model explainability or interpretability, and/or the like. In this regard, a plurality of silent variables may also be received or otherwise obtained and stored by the modeling system. The silent variables are not used by the first modeling solution to make predictions, but are still available to the modeling system for potential usage. In this regard, as shown by operation 402, the apparatus 200 includes means, such as processor 202, memory 204, communications circuitry 206, input-output circuitry 208, or the like, for receiving a silent variable set. In some embodiments, the silent variable set includes all variables available to the modeling system 102 that are not main variables. In other embodiments, the silent variable set includes only some variables available to the modeling system 102. The silent variable set may be received from a user (e.g., directly via input-output circuitry 208, or indirectly via communications circuitry 206), may be predefined and retrieved from storage (e.g., from memory 204 or a separate storage device 106), or may be received from a third party device or user (via communications circuitry 206).

As shown by operation 404, the apparatus 200 includes means, such as processor 202, memory 204, context analysis circuitry 210, or the like, for analyzing performance of a modeling solution over time. For example, the modeling system 102 may analyze output of the first modeling solution (e.g., using context analysis circuitry 210) to gauge performance of the first modeling solution in terms of how accurate the first modeling solution's predictions are over a period of time. In this regard, output of the first modeling solution may be compared to a ground truth so the predictions of the first modeling solution can be scored based on how accurate they are. The performance of the first modeling solution may be analyzed to detect occurrence of a triggering condition that indicates adjustment of the first modeling solution (e.g., activating one or more silent variables) may be needed to improve efficiency and mitigate performance deterioration of the modeling system.

In some embodiments, a triggering condition comprises a decline in performance of the first modeling solution, a change in exogenous context, or a decline in performance of the first modeling solution coupled with a change in exogenous context. In this regard, a detected change in exogenous context may warrant a need to adjust the first modeling solution if it is determined that the first modeling solution may begin outputting inaccurate predictions (e.g., in light of a significant shift in values of variables defining an exogenous context). In some embodiments, the modeling system 102 may continuously analyze exogenous context to determine gradual or sudden changes in exogenous context. However, in some embodiments, rather than continuously monitoring for changes in exogenous context, the modeling system may monitor performance of the first modeling solution, and in response to a performance decline, the modeling system 102 may then analyze exogenous context to determine if a change in exogenous context was a factor in the performance decline of the first modeling solution. In this regard, a change in exogenous context may not necessarily affect the first modeling solution to a degree where the first modeling solution would begin declining in performance, and the modeling system 102 may continue to utilize the same main variables for the first modeling solution to generate output. In some embodiments, when the first modeling solution exhibits a decline in performance, the exogenous context may then be analyzed to determine if there is a change in exogenous context which contributed to the decline. In this regard, if both a decline in performance of the source modeling solution and a change in exogenous context are determined to have occurred, the modeling system 102 may then continue to adjust the first modeling solution (e.g., by activating silent variables) to enable the first modeling solution to maintain or improve its ability to output accurate predictions given the new exogenous context. Still, in some embodiments and as further described below, the triggering condition may only comprise a performance decline of the source modeling solution, and in response, the modeling system may be adjusted by activating silent variables for the first modeling solution.

As shown by decision point 406, the apparatus 200 includes means, such as processor 202, memory 204, context analysis circuitry 210, or the like, for detecting occurrence of a triggering condition. As the modeling system 102 continuously analyzes performance of the first modeling solution, if it is determined that a triggering condition has not yet occurred (e.g., the first modeling solution continues to perform at an acceptable level and/or a change in exogenous context has not occurred), the method may return to operation 404 wherein the modeling system 102 (e.g., via context analysis circuitry 210) continues to analyze performance of the first modeling solution. This detection operation may occur continuously in a background process as the modeling system 102 is used in a production environment.

In some embodiments, the triggering condition comprises a decline in performance of the model meeting a predefined decline threshold. In this regard, the context analysis circuitry 210 may detect occurrence of the triggering condition by analyzing performance of the first modeling solution over time and identifying the predefined decline threshold in performance of the model.

In some embodiments, the predefined decline threshold may be identified in an instance in which analyzing performance of the first modeling solution over time indicates that the source modeling solution produces more than a predefined percentage of inaccurate predictions over a predefined time period. As one example, over a predefined time period (e.g., 3 days), if more than a predefined percentage (e.g., 60%) of the predictions output by the first modeling solution are determined to be inaccurate, the predefined decline threshold may be identified as having been met. The predefined percentage may be selected, for example, by a user for a particular implementation, or may simply comprise a default setting selected during initialization of the modeling system 102 or the first modeling solution.

In some embodiments, the predefined decline threshold may be identified in an instance in which analyzing performance of the first modeling solution over time indicates that a predefined number of predictions by the first modeling solution are inaccurate by more than a predefined performance threshold. As one example, if the first modeling solution outputs a series of at least five inaccurate predictions, the predefined decline threshold may be identified as having been met. The predefined performance threshold may be selected, for example, by a user for a particular implementation, or may simply comprise a default setting selected during initialization of the modeling system 102 or the first modeling solution.

In some embodiments, the triggering condition comprises a change in exogenous context. For example, if a significant change has occurred in the exogenous context, this change may warrant activation of silent variables to adjust the first modeling solution. However, as mentioned above, a change in exogenous context may not necessarily mean that the first modeling solution should be adjusted, if the first modeling solution continues output accurate predictions. In this regard, in some embodiments, the triggering condition comprises a decline in performance of the model coupled with a change in exogenous context. In this regard, a decline in performance may be due to a change in exogenous context.

In some embodiments, the context analysis circuitry may identify a change in exogenous context (and therefore identify the occurrence of a triggering condition) through a similarity calculation of context vectors, as described below in connection with FIG. 5.

Figure 5:
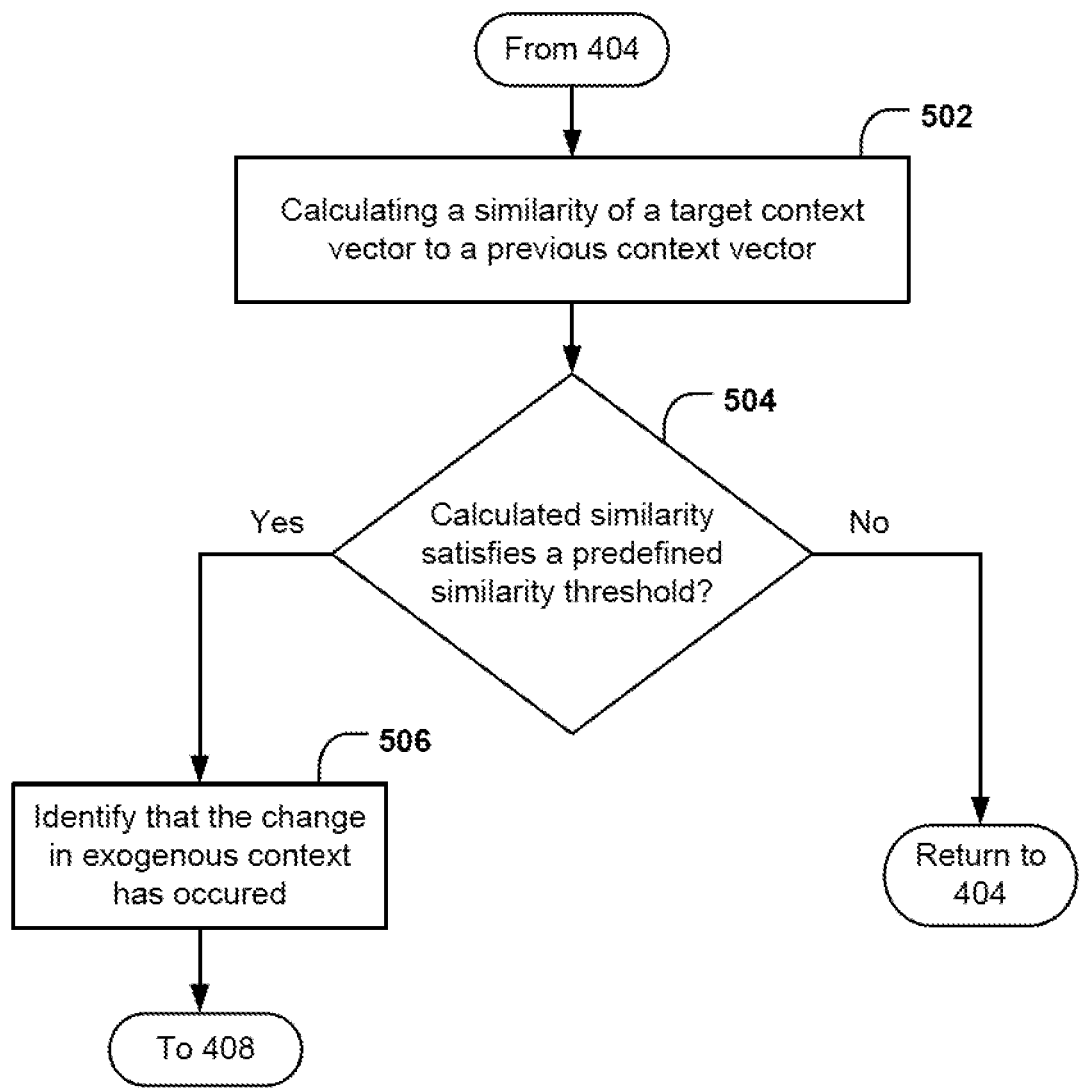
FIG. 5 illustrates an example flowchart for identifying occurrence of a change in exogenous context, in accordance with some example embodiments described herein.

Turning briefly to FIG. 5, example operations are shown for identifying occurrence of a change in exogenous context.

As shown by operation 502, the apparatus 200 includes means, such as processor 202, memory 204, context analysis circuitry 210, and/or the like, for calculating a similarity of a target context vector to a previous context vector. For example, a target context vector may be a context vector that defines an exogenous context for a data point being processed by the first modeling solution of the modeling system 102. For example, the data point may be a current data point being analyzed by the source modeling solution in order to output a prediction based on the data point. A previous context vector may be a context vector defining an exogenous context for the same data point obtained by the modeling system 102 and processed by the source modeling solution at a previous point in time. For example, the previous context vector may comprise the most recent exogenous context for that data point prior to receiving the target data point. In some embodiments, the previous context vector may comprise multiple context vectors obtained prior to the data point associated with the target context vector (e.g., multiple data points over a previous 24-hour period).

In some embodiments, calculating the similarity of the target context vector to a previous context vector may comprise calculating the cosine similarity of the target context vector and the previous context vector. A cosine similarity operation measures the cosine of the angle between two vectors, which is the inner product of the same vectors normalized to both have length 1. As shown by decision point 504, the apparatus 200 includes means, such as processor 202, memory 204, context analysis circuitry 210, or the like, for determining whether the calculated similarity satisfies a predefined similarity threshold. The predefined similarity threshold may be selected by a user for a particular implementation, or may simply comprise a default setting selected during initialization of the modeling system 102 or source modeling solution. The threshold may be adjusted based on the sensitivity of a given modeling solution to exogenous context (for a model that is highly context-dependent, the similarity threshold may be more exacting than for a model that is known to be durable and reliable in a variety of contexts). If the resulting calculated cosine similarity does not satisfy the predefined similarity threshold (e.g., the variable values of the target context vector and previous context vector are substantially similar), it may be determined that a change in exogenous context has not occurred and the method may return to operation 404 wherein performance of the modeling solution continues to be analyzed. However, if the resulting calculated cosine similarity satisfies a predefined similarity threshold (e.g., the variable values of the target context vector have changed significantly from values of previous context vector), the method may continue to operation 506. Although calculation of the similarity of a target context vector to a previous context vector may be performed using a cosine similarity operation, it will be appreciated that other similarity measures may additionally, or alternatively, be used to evaluate similarity of two context vectors, such as their Euclidean distance, Manhattan distance, Minkowski distance, dot product, Pearson similarity, or the like. Multiple similarity measures may be used in combination in some embodiments, with the predefined similarity threshold identifying a required value for one or more of the multiple similarity measures.

As shown by operation 506, the apparatus 200 includes means, such as processor 202, memory 204, context analysis circuitry 210, or the like, for identifying that the change in exogenous context has occurred. In some embodiments, if the resulting calculated cosine similarity satisfies a predefined similarity threshold (e.g., the variable values of the target context vector have changed significantly from values of previous context vector), the context analysis circuitry 210 may also identify pivotal variables of the target context vector that exhibited a significant change from the previous context vector. In this regard, the apparatus 200 includes means, such as processor 202, memory 204, context analysis circuitry 210, or the like, for identifying, in response to identifying the change in exogenous context, pivotal variables based on the identified change in exogenous context. The pivotal variables indicate the important factors which caused the change in exogenous context, such that correlated silent variables may be subsequently identified and activated, as further described below. Pivotal variables may be identified in a variety of ways, such as, for example, by comparing a difference in values of a variable for a target context vector and a previous context vector to a predefined threshold. If the difference exceeds the threshold, the variable may be recognized as pivotal.

As discussed above, in embodiments in which the triggering condition comprises detecting a change in exogenous context, the triggering condition is thus determined to be met, and the method may continue to operation 408 of FIG. 4, described below. In other embodiments, the triggering condition may comprise a change in exogenous context coupled with a decline in performance of the first modeling solution. In these embodiments, if both the change in exogenous context and the decline in performance of the first modeling solution are identified, the method may then continue to operation 408.

Returning to FIG. 4, as shown by operation 408, the apparatus 200 includes means, such as processor 202, memory 204, model adjustment circuitry 214, and/or the like, for adjusting the modeling system based on the silent variable set. In this regard, it is determined that adjusting the first modeling solution by activating silent variables of the silent variable set is needed based on the occurrence of the triggering condition (e.g., a change in exogenous context, a decline in performance of the modeling solution, or a combination of both). In some embodiments, the modeling system 102 may simply activate all silent variables available to the modeling system 102. In this regard, the apparatus 200 includes means, such as processor 202, memory 204, model adjustment circuitry 214, and/or the like, for applying each silent variable of the silent variable set to a modeling solution to determine a predictive output of the modeling system.

In some embodiments, "activating" a silent variable comprises adjusting a modeling solution such that the silent variable is taken into account in a determination of a prediction. For example, in some embodiments, applying each silent variable may comprise adjusting weights to all of the silent variables in the silent variable set such that the weights of each silent variable become non-zero. In some embodiments, the modeling system 102 may switch to a different modeling solution which already has the silent variables activated. In some embodiments, the modeling system 102 may initiate re-training of the modeling solution to account for the silent variable set. In some embodiments, and as further described below "deactivating" a variable may comprise adjusting a modeling solution such that the variable is no longer taken into account in a determination of a prediction (e.g., applying a zero weight to the variable, etc.).

In this regard, a modeling solution is enabled to account for a plurality of other variables when making predictions, which may aid in the modeling solution's ability to continue to make accurate predictions in light of the new exogenous context and/or another disruption causing a decline in modeling solution performance. However, in some embodiments, rather than activating all silent variables, the modeling system 102 may instead perform a variable contribution analysis process in order to identify the most relevant silent variables to activate, and, in some embodiments, which main variables, if any, to deactivate in light of a changed exogenous context.

Figure 6:
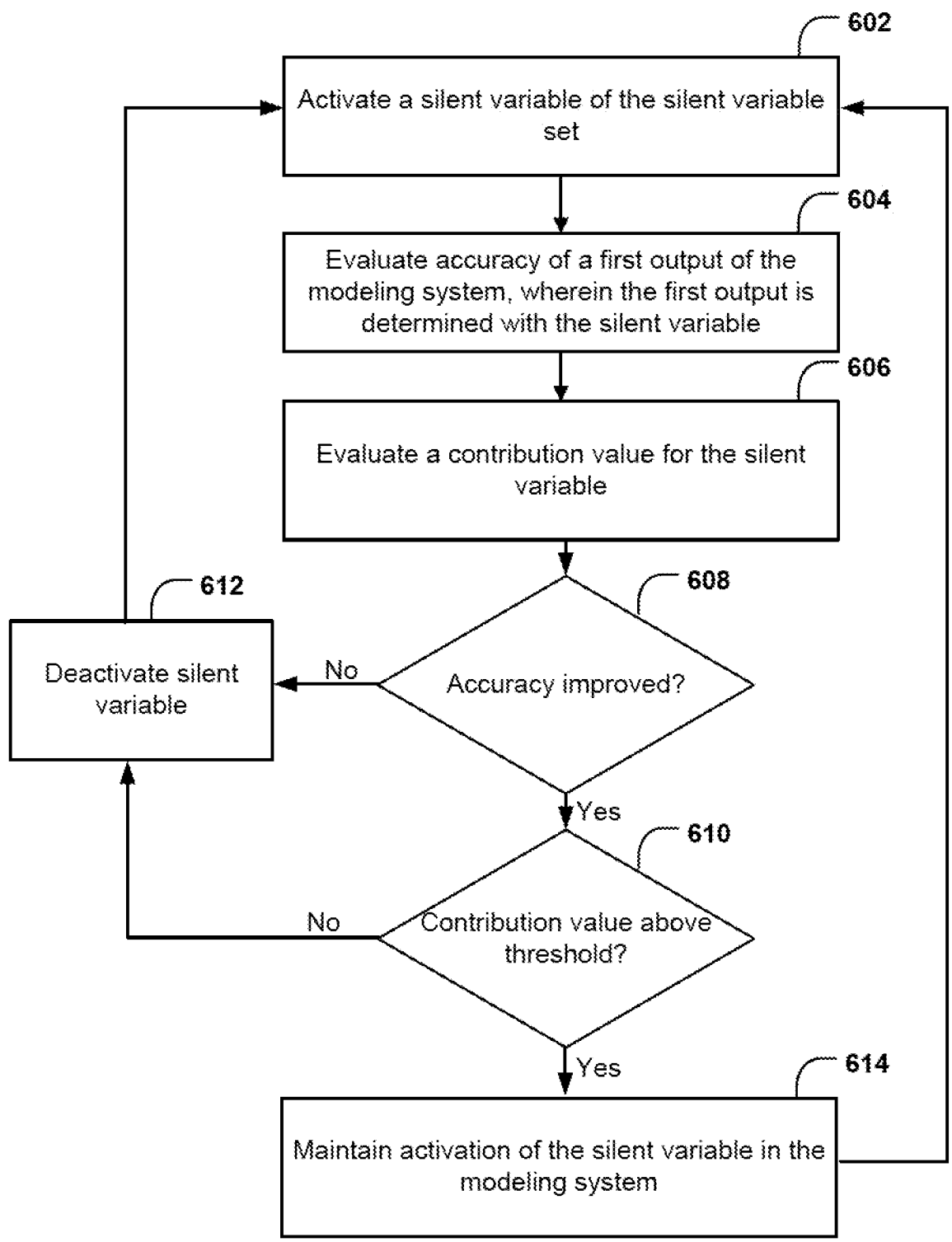
FIG. 6 illustrates an example flowchart for an example variable contribution analysis process, in accordance with some example embodiments described herein.

Turning to FIG. 6, example operations are shown for analyzing the contribution of a given variable to a modeling solution's predictions.

As mentioned above, rather than a blanket activation of all silent variables, the modeling system 102 may perform a variable contribution analysis process that iteratively activates and analyzes each variable of a silent variable set one at a time in order to gauge whether the modeling solution's performance improves with the activated silent variable and whether the activated silent variable contributes significantly enough to a prediction of the modeling solution to warrant maintaining activation of the silent variable. In some embodiments, the modeling system 102 may perform this process to identify the fewest number of variables that can be used by a modeling solution while still making accurate predictions, and in doing so may both enhance the efficiency of computational resource utilization and increase the explainability and interpretability of the modeling solution.

As shown by operation 602, the apparatus 200 includes means, such as processor 202, memory 204, model adjustment circuitry 214, and/or the like, for activating a silent variable of a silent variable set. In some embodiments, the silent variable set may comprise all silent variables available to the modeling system 102. However, in some embodiments, the silent variable set may be a subset of all the silent variables available to the modeling system 102. In this regard, a subset of silent variables may first be selected based on the subset of silent variables being correlated to the pivotal variables identified from the change in exogenous context. In this regard, the apparatus 200 includes means, such as processor 202, memory 204, context analysis circuitry 210, and/or the like, for selecting, in response to detecting the occurrence of the triggering condition, a subset of the silent variable set based on a correlation of silent variables of the subset to the pivotal variables. By selecting a subset of silent variables correlated to the identified pivotal variables, the modeling system 102 may reduce the number of silent variables needed for analyzing through the variable contribution analysis processing while only focusing on variables that may actually have an effect on improving the modeling system.

By activating a silent variable of the silent variable set, in some embodiments, the silent variable may have a weight applied to the variable (e.g., a coefficient value greater or less than zero) in a calculation by the first modeling solution to determine a predictive output. As shown by operation 604, the apparatus 200 includes means, such as processor 202, memory 204, model adjustment circuitry 214, and/or the like, for evaluating accuracy of a first output of the modeling system. The first output may be a prediction generated by the first modeling solution while having the silent variable activated. For example, the accuracy may be evaluated such that the prediction may be compared to a ground truth and scored based on how accurate the prediction is. In this regard, the score may be compared to a predefined accuracy threshold to determine if the score satisfies the predefined accuracy threshold. In some embodiments, the modeling system 102 may determine whether the accuracy has improved with the silent variable having been activated. In this regard, a set of predictions (e.g., 10 predictions) may be compared to a previous set of predictions having been generated without the activated silent variable, and if more predictions are correct with the silent variable activated, it may be determined that the accuracy of the modeling system has improved.

In some embodiments, a contribution value for the activated silent variable may be determined and evaluated. For example, the contribution value may be a SHAP value calculated for the activated silent variable. The SHAP value indicates the variable's contribution to the prediction. As shown by operation 606, the apparatus 200 includes means, such as processor 202, memory 204, model adjustment circuitry 214, and/or the like, for evaluating a contribution value for the silent variable. In this regard, the contribution value may be compared to a predefined contribution threshold to determine whether the contribution value satisfies the predefined contribution threshold.

At decision point 608, if it is determined that the accuracy of the modeling solution has not improved, the process may continue to operation 612, wherein the apparatus 200 includes means, such as processor 202, memory 204, model adjustment circuitry 214, and/or the like, for deactivating the silent variable. In some embodiments, deactivating the silent variable may comprise applying zero weight to the silent variable such that the modeling solution continues to make predictions without regard to the silent variable. The process may then return to operation 602, wherein a different silent variable of the silent variable set is activated and subsequently analyzed. However, if it is determined that the accuracy of the modeling solution has improved, the process may continue to decision point 610. If the contribution value is determined to not satisfy a predefined threshold (e.g., the variable's contribution to the prediction is minimal), the process may then continue to operation 612 wherein the silent variable is deactivated. However, if it is determined that the contribution value satisfies the predefined threshold (e.g., the variable contributed significantly to the prediction), the process continues to operation 614, wherein the apparatus includes means, such as processor 202, memory 204, model adjustment circuitry 214, and/or the like, for maintaining activation of the silent variable in the modeling system. In this regard, the modeling solution may continue to make predictions using the activated silent variable. In some embodiments, the process may then return to operation 602, wherein a different silent variable of the silent variable set is activated and subsequently analyzed.

Figure 7:
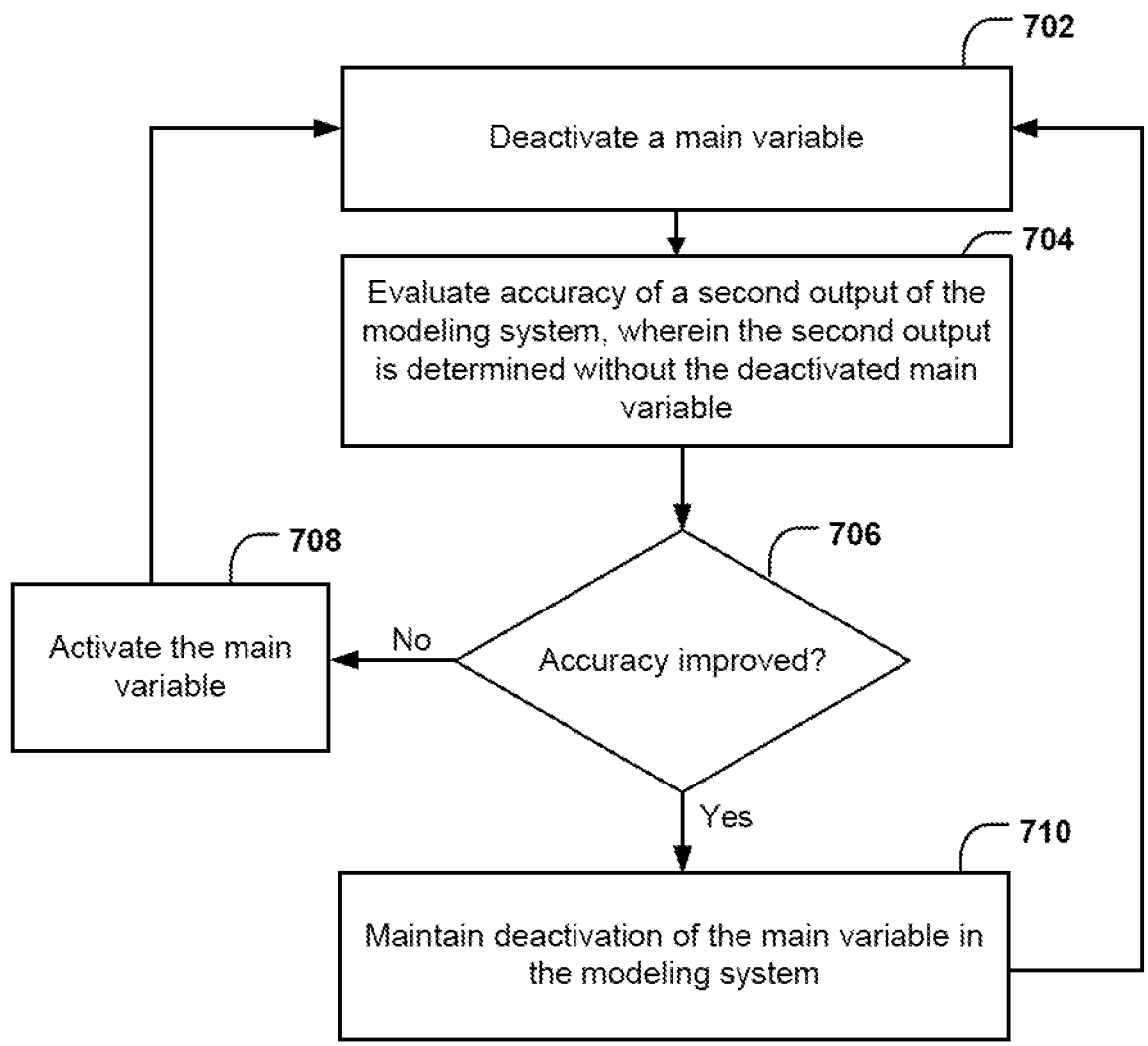
FIG. 7 illustrates another example flowchart for an example variable contribution analysis process, in accordance with some example embodiments described herein.

In some embodiments, the variable contribution analysis process may also include deactivating main variables to determine whether accuracy of the modeling solution improves. Turning to FIG. 7, example additional operations for the variable contribution analysis process are shown.

As shown by operation 702, the apparatus 200 includes means, such as processor 202, memory 204, model adjustment circuitry 214, and/or the like, for deactivating a main variable. The main variable may be a variable previously used prior to the detected change in exogenous context and/or other triggering condition. In some embodiments, each main variable may be deactivated one at a time and an accuracy of an output having been determined without the respective main variable may be analyzed to determine whether to maintain deactivation of the main variable. In some embodiments, only some main variables may be selected for deactivation and to undergo the variable contribution analysis process. For example, main variables may be selected for deactivation based on being correlated to pivotal variables as described above.

As shown by operation 704, the apparatus 200 includes means, such as processor 202, memory 204, model adjustment circuitry 214, and/or the like, for evaluating accuracy of a second output of the modeling system. The second output may be a prediction generated by the first modeling solution while having the main variable deactivated. For example, the accuracy may be evaluated such that the prediction may be compared to a ground truth and scored based on how accurate the prediction is. In some embodiments, the modeling system 102 may determine whether the accuracy has improved with the main variable having been deactivated. In this regard, a set of predictions (e.g., 10, 100, 1,000, or any other suitable number of predictions that would provide a statistically significant sample size for the implementation) made with the main variable deactivated may be compared to a previous set of predictions having been generated while the main variable was still active, and if more predictions are correct with the main variable deactivated, it may be determined that the accuracy of the modeling system has improved. At decision point 706, if it is determined that the accuracy of the modeling solution has not improved, the process may continue to operation 708, wherein the apparatus 200 includes means, such as processor 202, memory 204, model adjustment circuitry 214, and/or the like, for activating the main variable. In some embodiments, deactivating the silent variable may comprise re-applying a weight to the main variable such that the modeling solution continues to make predictions using the main variable. The process may then return to operation 702, wherein a different main variable is deactivated and an output of the modeling solution is subsequently analyzed. However, if it is determined that the accuracy of the modeling solution has improved in response to the main variable being deactivated, the process may continue to operation 710, wherein the apparatus includes means, such as processor 202, memory 204, model adjustment circuitry 214, and/or the like, for maintaining deactivation of the main variable in the modeling system. In this regard, the modeling solution may continue to make predictions with the main variable being deactivated. In some embodiments, the process may then return to operation 702, wherein a different main variable is deactivated and an output of the modeling solution is subsequently analyzed.

As described above, example embodiments provide methods and apparatuses that enable improved mitigation of modeling system performance deterioration. Example embodiments thus provide tools that overcome problems faced by modeling systems in circumstances in which exogenous factors disrupt the ability of one or more modeling solutions to produce accurate and reliable output. By both quickly recognizing triggering conditions which may lead to modeling solution performance deterioration and, in response, automatically activating silent variables to adjust a modeling solution to be more acutely tuned to a new exogenous context, example embodiments thus save time and resources, while also enhancing modeling system robustness against changes in exogenous context that are inevitable in any real-world implementation. The speed and consistency of the modeling system performance mitigation exhibited by example embodiments unlocks many potential new functions that have historically not been available, such as the ability to adjust modeling solutions in near-real-time using a continuously-evolving linkage of correlated variables. As these examples all illustrate, example embodiments contemplated herein provide technical solutions that solve real-world problems faced during active deployment of modeling systems used for predicting events, behaviors, or the like.

FIGS. 3-7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for improving efficiency and performance of a machine learning modeling system comprising a modeling solution, the method comprising:
    detecting, by context analysis circuitry, occurrence of a triggering condition comprising a decline in predictive performance of the modeling solution caused by a change in exogenous context, wherein the modeling solution is associated with an active variable set and a silent variable set, wherein the active variable set comprises variables in active use by the modeling solution to generate predictions, and wherein the silent variable set comprises variables not in active use by the modeling solution to generate the predictions;
    in response to the decline meeting a predefined decline threshold, automatically adjusting, by model adjustment circuitry, the machine learning modeling system based on the silent variable set, wherein automatically adjusting the machine learning modeling system comprises:
        identifying, by the model adjustment circuitry, a set of context-relevant variables from the silent variable set that are relevant to the change in exogenous context, and
        re-training, by the model adjustment circuitry, the modeling solution by activating a fewest number of context-relevant variables from the set of context-relevant variables that exhibit a mitigation of the decline in the predictive performance of the modeling solution; and
    generating, by the model adjustment circuitry and using the re-trained modeling solution, a first predictive output based at least on the activated context-relevant variables, wherein the first predictive output indicates an outcome projected to occur as a result of the change in exogenous context.

2. The method of claim 1, wherein automatically adjusting the machine learning modeling system comprises activating, by the model adjustment circuitry, each silent variable of the silent variable set in connection with the modeling solution to determine a predictive output of the modeling solution.

3. The method of claim 1,
    wherein the context analysis circuitry detects the occurrence of the triggering condition by (i) analyzing the predictive performance of the modeling solution over time, (ii) identifying the predefined decline threshold in the predictive performance of the modeling solution, and (iii) in response to identifying the occurrence of the predefined decline threshold in the predictive performance of the modeling solution, identifying the change in exogenous context.

4. The method of claim 3, wherein the predefined decline threshold is met in an instance in which analyzing the predictive performance of the modeling solution over time indicates that the modeling solution produces more than a predefined percentage of inaccurate predictions over a predefined time period.

5. The method of claim 3, wherein the predefined decline threshold is met in an instance in which analyzing the predictive performance of the modeling solution over time indicates that a predefined number of predictions by the modeling solution are inaccurate by more than a predefined performance threshold.

6. The method of claim 3, wherein the context analysis circuitry identifies the change in exogenous context by:
    calculating a similarity of a target context vector to at least one previous context vector;
    determining whether the calculated similarity does not satisfy a predefined similarity threshold; and
    in response to determining that the calculated similarity does not satisfy the predefined similarity threshold, identifying that the change in exogenous context has occurred.

7. The method of claim 3, further comprising:
identifying, by the context analysis circuitry and in response to identifying the change in exogenous context, pivotal variables based on the change in exogenous context.

8. The method of claim 7, further comprising:
selecting, by the context analysis circuitry and in response to detecting the occurrence of the triggering condition, a subset of the silent variable set based on a correlation of silent variables to the subset to the pivotal variables.

9. The method of claim 1, wherein adjusting the modeling system comprises:
iteratively performing, by the model adjustment circuitry, a variable contribution analysis process for each silent variable in the silent variable set, the variable contribution analysis process comprising:
activating a silent variable of the silent variable set,
determining a first output of the modeling solution using the activated silent variable,
evaluating accuracy of the first output,
evaluating a contribution value of the activated silent variable to the first output, and
in an instance in which the accuracy of the first output does not satisfy a predefined accuracy threshold or the contribution value does not satisfy a predefined contribution threshold, deactivating the activated silent variable.

10. The method of claim 9, wherein the variable contribution analysis process further comprises:
deactivating an active variable of the active variable set;
determining, a second output of the modeling solution without using the active variable;
evaluating accuracy of the second output; and
in an instance in which the accuracy of the second output does not satisfy a predefined accuracy threshold, reactivating the active variable.

11. An apparatus for improving efficiency and performance of a machine learning modeling system comprising a modeling solution, the apparatus comprising:
context analysis circuitry configured to detect occurrence of a triggering condition comprising a decline in predictive performance of the modeling solution caused by a change in exogenous context, wherein the modeling solution is associated with an active variable set and a silent variable set, wherein the active variable set comprises variables in active use by the modeling solution to generate predictions, and wherein the silent variable set comprises variables not in active use by the modeling solution to generate the predictions; and
model adjustment circuitry configured to automatically adjust, in response to the decline meeting a predefined decline threshold, the machine learning modeling system based on the silent variable set, wherein the model adjustment circuitry automatically adjusts the machine learning modeling system by:
identifying a set of context-relevant variables from the silent variable set that are relevant to the change in exogenous context, and
re-training the modeling solution by activating a fewest number of context-relevant variables from the set of context-relevant variables that exhibit a mitigation of the decline in the predictive performance of the modeling solution; and
generate, using the re-trained modeling solution, a first predictive output based at least on the activated context-relevant variables, wherein the first predictive output indicates an outcome projected to occur as a result of the change in exogenous context.

12. The apparatus of claim 11, wherein the model adjustment circuitry automatically adjusts the machine learning modeling system by:
activating each silent variable of the silent variable set in connection with the modeling solution to determine a predictive output of the modeling solution.

13. The apparatus of claim 11,
wherein the context analysis circuitry detects the occurrence of the triggering condition by (i) analyzing the predictive performance of the modeling solution over time, (ii) identifying the predefined decline threshold in the predictive performance of the modeling solution, and (iii) in response to identifying the occurrence of the predefined decline threshold in the predictive performance of the modeling solution, identifying the change in exogenous context.

14. The apparatus of claim 13, wherein the predefined decline threshold is met in an instance in which analyzing the predictive performance of the modeling solution over time indicates that the modeling solution produces more than a predefined percentage of inaccurate predictions over a predefined time period.

15. The apparatus of claim 13, wherein the predefined decline threshold is met in an instance in which analyzing the predictive performance of the modeling solution over time indicates that a predefined number of predictions by the modeling solution are inaccurate by more than a predefined performance threshold.

16. The apparatus of claim 13, wherein the context analysis circuitry identifies the change in exogenous context by:
calculating a similarity of a target context vector to at least one previous context vector;
determining whether the calculated similarity does not satisfy a predefined similarity threshold; and
in response to determining that the calculated similarity does not satisfy the predefined similarity threshold, identifying that the change in exogenous context has occurred.

17. The apparatus of claim 13, wherein the context analysis circuitry is further configured to:
identify, in response to identifying the change in exogenous context, pivotal variables based on the change in exogenous context.

18. The apparatus of claim 17, wherein the context analysis circuitry is further configured to:
select, in response to detecting the occurrence of the triggering condition, a subset of the silent variable set based on a correlation of silent variables to the subset to the pivotal variables.

19. The apparatus of claim 11, wherein the model adjustment circuitry adjusts the machine learning modeling system by:
iteratively performing a variable contribution analysis process for each silent variable in the silent variable set, the variable contribution analysis process comprising:
activating a silent variable of the silent variable set,
determining a first output of the modeling solution using the activated silent variable,
evaluating accuracy of the first output;
evaluating a contribution value of the activated silent variable to the first output; and in an instance in which the accuracy of the first output does not satisfy a predefined accuracy threshold or the contribution value does not satisfy a predefined contribution threshold:
   deactivating the activated silent variable.

20. The apparatus of claim 19, wherein the variable contribution analysis process further comprises:
   deactivating an active variable of the active variable set;
   determining, a second output of the modeling solution without using the active variable;
   evaluating accuracy of the second output; and
   in an instance in which the accuracy of the second output does not satisfy a predefined accuracy threshold:
   reactivating the active variable.

* * * * *